United States Patent [19]
Meadows et al.

[11] Patent Number: 4,922,061
[45] Date of Patent: May 1, 1990

[54] CAPACITIVE TOUCH PANEL SYSTEM WITH RANDOMLY MODULATED POSITION MEASUREMENT SIGNAL

[75] Inventors: R. David Meadows, Beaverton; Roger J. McCoy, Portland, both of Oreg.

[73] Assignee: Tektronix, Inc., Beaverton, Oreg.

[21] Appl. No.: 383,113

[22] Filed: Jul. 20, 1989

Related U.S. Application Data

[63] Continuation-in-part of Ser. No. 205,896, Jun. 13, 1988, Pat. No. 4,853,498.

[51] Int. Cl.⁵ .............................................. G08C 21/00
[52] U.S. Cl. ....................................... 178/19; 340/706
[58] Field of Search ............................ 178/19; 340/706

[56] References Cited

U.S. PATENT DOCUMENTS

| | | | |
|---|---|---|---|
| 4,476,463 | 10/1984 | Ng et al. ............................... | 340/712 |
| 4,680,430 | 7/1987 | Yoshikawa et al. ................... | 178/19 |
| 4,698,460 | 10/1987 | Krein et al. ............................ | 178/19 |
| 4,698,461 | 10/1987 | Meadows et al. ..................... | 178/19 |
| 4,707,845 | 11/1987 | Krein et al. ............................ | 178/19 |

*Primary Examiner*—Stafford D. Schreyer
*Attorney, Agent, or Firm*—John D. Winkelman; Mark M. Meininger

[57] ABSTRACT

A capacitive touch panel system (10) having a faceplate (14) with an electrically conductive layer (20) of a consistent resistivity employs a position measurement apparatus (12) to generate an address signal indicative of a position (46) on the faceplate in contact with a stylus (48). The position measurement apparatus includes a position measurement signal source (56) that generates a square-wave measurement signal of a frequency that varies in a substantially random manner. The position measurement signal is applied to a first pair of opposed electrodes (36) and (40) and a second pair of opposed electrodes (38) and (42) positioned along respective side margins (26, 30, 28, and 32) of the faceplate. The resistivity of the conductive layer establishes effective resistances of $R_x$ and $R_y$ between the respective first and second pairs of electrodes. Position measurement subcircuits (54a-54d) are locked-in with the random measurement signal frequencies to measure currents drawn through the electrodes whenever the stylus contacts the conductive layer, thereby to form an address signal indicative of the location at which the stylus contacts the faceplate. The random measurement signal frequencies reduce the susceptibility of the position measurement apparatus to electromagnetic noise and distributes over a relatively broad bandwidth the electromagnetic noise generated by the position measurement apparatus.

22 Claims, 2 Drawing Sheets

CAPACITIVE TOUCH PANEL SYSTEM WITH RANDOMLY MODULATED POSITION MEASUREMENT SIGNAL

This is a continuation-in-part of application Ser. No. 07/205,896, filed June 13, 1988, U.S. Pat. No. 4,853,498.

TECHNICAL FIELD

The present invention relates to touch panel systems of the type having electrically conductive faceplates and, in particular, to such a touch panel system in which a position measurement apparatus generates an address signal that is indicative of a location at which a stylus contacts the faceplate.

BACKGROUND OF THE INVENTION

A touch panel system is a data input device that allows an operator to interact with information rendered on a display screen. For example, the operator can select one of multiple computer command options rendered at different locations on the display screen by touching the screen at one of the locations. A touch panel system employs a position measurement apparatus that generates an address signal indicative of the touched location. The address signal is delivered to a computer that determines from the address signal which one of the command options is selected. The object with which the operator touches the display screen is called a stylus and may include, for example, the operator's finger, a pen, or a pencil.

A touch panel system of the capacitive-type typically includes a faceplate that has on its outer major surface on optically transparent, electrically conductive coating of a preselected resistivity. The faceplate is positioned in front of the display screen of a display device so that an operator can touch the conductive coating at locations aligned with information rendered on the display screen.

The operator touches the conductive coating with a stylus having a nonzero, finite capacitance with reference to electrical ground. The stylus causes a change in the characteristics of an amplitude modulated position measurement signal applied to the conductive coating. The touch panel sysem distinguishes the location the stylus contacts from the other locations on the faceplate in accordance with the change in the characteristics of the position measurement signal.

The conductive coating on the faceplate causes a capacitive touch panel system to suffer from at least two disadvantages. First, the conductive coating is receptive to electromagnetic noise generated by the display system (e.g. cathode-ray tube flyback pulses) or present within the environment (e.g. 60 Hz background noise). Such noise susceptibility can render difficult the determination of a touch location. Second, the conductive coating causes the touch panel system to generate electromagnetic interference at the frequency of the position measurement signal. As a result, a capacitive touch panel system typically generates substantial amounts of electromagnetic noise.

SUMMARY OF THE INVENTION

An object of the present invention is, therefore, to provide a position measurement apparatus for a capacitive touch panel system.

Another object of this invention is to provide such an apparatus having a reduced susceptibility to electromagnetic noise.

A further object of this invention is to provide such a system that generates reduced amounts of electromagnetic noise at any single specific measurement signal frequency.

The present invention is a touch panel system with a position measurement apparatus that generates an address signal indicative of a position on the touch panel in contact with a capacitive stylus. The stylus has a nonzero, finite capacitance with reference to electrical ground.

In a preferred embodiment, the touch panel system includes a rectangular faceplate with an electrically conductive layer. The conductive layer has a consistent resistivity, covers the entire outer major surface of the faceplate, and carries four bar electrodes. A different one of the bar electrodes extends along almost the entire length and near each of the side margins of the outer major surface of the faceplate. The bar electrodes form two pairs of generally parallel opposed electrical contacts. Each bar electrode is electrically connected to the conductive layer and the position measurement apparatus.

The position measurement apparatus includes a measurement signal source that generates an amplitude modulated measurement signal of a frequency that varies in a substantially random manner. The measurement signal is applied simultaneously to each of the bar electrodes. The apparatus identifies a position on the faceplate in contact with the stylus by measuring the measurement signal current that the stylus draws through each electrode. The current drawn through each electrode is inversely proportional to the separation between the electrode and the position at which the stylus touches the faceplate. The current measurements obtained with respect to the four electrodes are analyzed by a microprocessor to identify the position.

The position is identified separately with respect to each one of the bar electrodes. The following description relates to the position identification with respect to an exemplary one of the bar electrodes. Such description would apply similarly to each of the three remaining electrodes.

The signal source transmits the measurement signal to the bar electrode through the primary coil of a transformer. The transformer develops across the output terminals of a secondary coil a potential difference proportional to the current that the stylus draws through the bar electrode. A differential amplifier having first and second input terminals is electrically connected to the ouput terminals of the secondary coil of the transformer. The differential amplifier receives the potential difference and generates positive and negative differential output signals proportional to the current. The transformer cooperates, therefore, with the differential amplifier to function as a current meter that measures the current drawn through the electrode.

A signal demodulator of the lock-in type employs the same random frequency measurement signal as a reference for demodulating the positive and negative differential output signals. A low-pass filter connected to the signal demodulator provides from the demodulated signal a substantially steady-state address signal that corresponds to an average of the magnitude of the current drawn through the bar electrode.

The position measurement apparatus of the present invention has reduced susceptibility to electromagnetic noise because of the lock-in characteristics of the signal demodulator and the low-pass filter. In addition, the position measurement apparatus of this invention generates electromagnetic noise that is spread over the bandwidth of the random frequencies of the position measurement signal. As a result, the position measurement apparatus generates reduced amounts of electromagnetic noise at any single specific measurement signal frequency.

Additional objects and advantages of the present invention will be apparent from the detailed description of a preferred embodiment thereof, which proceeds with reference to the accompanying drawings.

DETAILED DESCRIPTION OF PREFERRED EMBODIMENT

Figure 1:
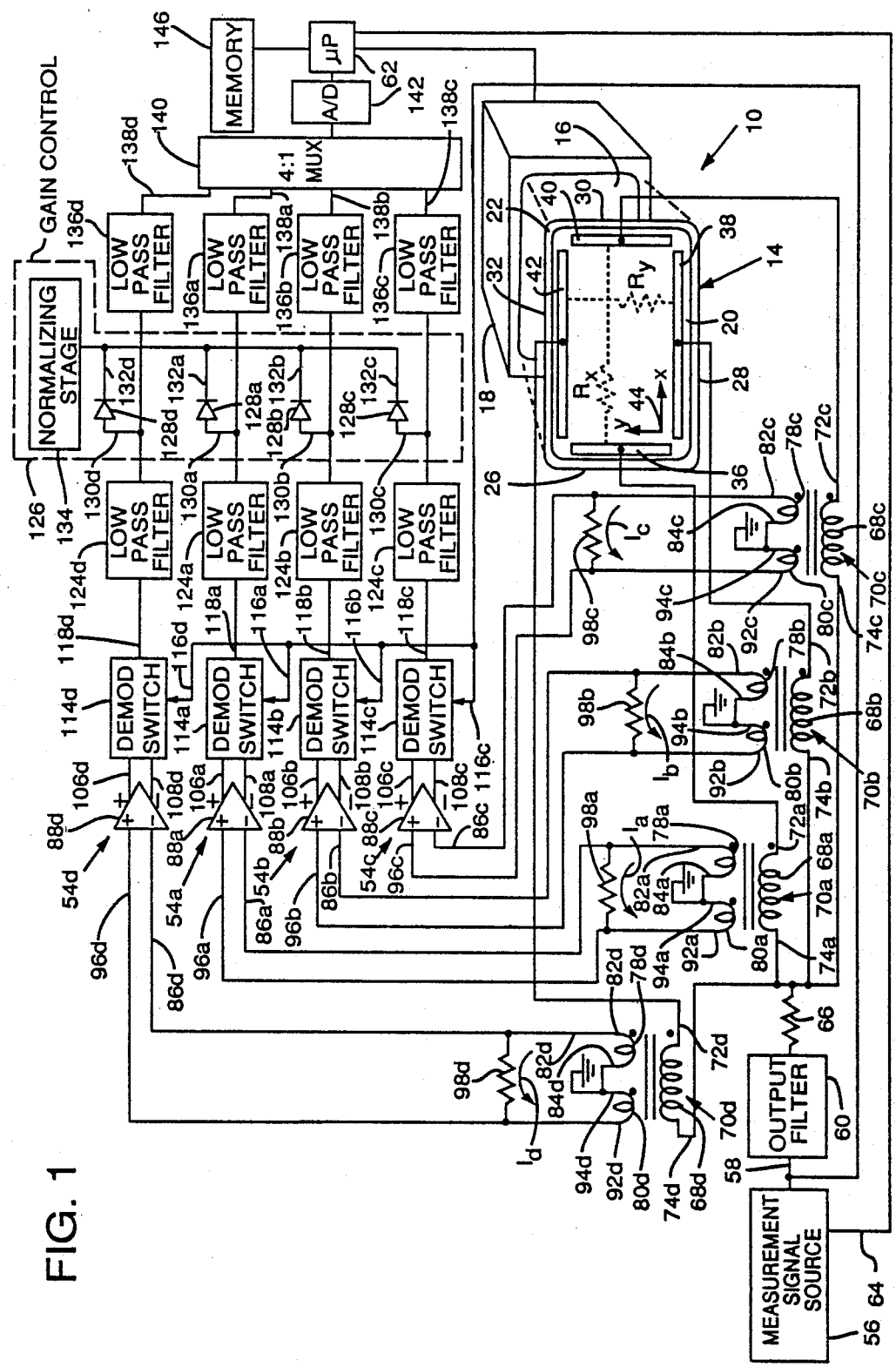
FIG. 1 is a schematic block diagram of a position measurement apparatus of the present invention implemented in a touch panel system.

FIG. 1 schematically shows a touch panel system 10 and an associated position measurement apparatus 12 of the present invention. Touch panel system 10 includes an optically transparent faceplate 14 positioned face-to-face with the display screen 16 of a display device 18 that incorporates, for example, a cathode-ray tube. It will be appreciated that the display device 18 could alternatively include a liquid crystal display or a signboard that displays fixed information such as a numeric key pad.

Faceplate 14 includes an optically transparent, electrically conductive layer 20 that covers substantially all of an outer major surface 22 of faceplate 14. Layer 20 is formed from indium tin oxide (ITO) and has a consistent resistivity. Faceplate 14 is typically of a rectangular shape and includes on major surface 22 a first pair of opposed side margins 26 and 30 and a second pair of opposed side margins 28 and 32.

Electrodes 36, 38, 40 and 42 in the form of bars or strips are positioned on and extend along major portions of the lengths of side margins 26, 28, 30, and 32, respectively. Electrodes 36 and 40 and electrodes 38 and 42 form two pairs of opposed electrical contacts that are electrically connected along their lengths to conductive layer 20. Electrodes 36 and 40 define across faceplate 14 an X-axis having its origin 44 located near the bottom side of electrode 36, and electrodes 38 and 42 define across faceplate 14 a Y-axis having its origin 44 located near the left side of electrode 38.

The resistivity of layer 20 establishes effective total resistances $R_x$ and $R_y$ in the respective X- and Y-axis directions across faceplate 14. Position measurement apparatus 12 identifies a position or location 46 (FIG. 2) on faceplate 14 in contact with a capacitive stylus 48 (FIG. 2) such as, for example, a person's finger. (The location 46 is hereinafter referred to as "touch location 46.") Stylus 48 may be modeled as a capacitor 50 and a resistor 52 electrically connected in parallel to ground. Capacitor 50 can have a capacitance of between 5 and several hundred picofarads. Resistor 52 can have effectively any resistance. Position measurement apparatus 12 identifies touch location 46 by measuring the separation between location 46 and each one of electrodes 36, 38, 40, and 42.

Position measurement apparatus 12 comprises four similar position measurement subcircuits 54a, 54b, 54c, and 54d that are connected to the respective electrodes 36, 38, 40, and 42 to generate an address signal indicative of the separation between touch location 46 and each of the electrodes. Subcircuits 54a-54d preferably operate simultaneously or "in parallel" to generate the address signal. Corresponding components of position measurement subcircuits 54a-54d have identical reference numerals with letter suffices "a"-"d", respectively. The following description is directed by way of example only to position measurement subcircuit 54a and is similarly applicable to position measurement subcircuits 54b-54d.

A position measurement signal source 56 generates a bipolar continuous square-wave measurement signal and is delivered to an input 58 of a source output filter 60. The measurement signal alternates between a positive voltage, $+V$, and a negative voltage level, $-V$, at a frequency that varies in a substantially random manner. In the prferred embodiment, a microporcessor 62 functions as a pseudo-random number generator that generates a pseudo-random number signal that is delivered to an input 64 of measurement signal source 56. In response to the pseudo-random number signal, measurement signal source 56 generates the measurement signal with a frequency of between 150 and 250 kHz in accordance with the value of the pseudo-random number. Microprocessor 62 generates the pseudo-random numbers at a frequency of about 50 kHz.

Output filer 60 is preferably of the low-pass type and cooperates with an output resistor 66 to establish an output impedance of 2 kilohms. This output impedance functions to improve the uniformity of the signal-to-noise ratios of the signals on electrodes 36-42, as will be described below in greater detail. Output filter 60 delivers the square-wave measurement signal to electrode 36 via the primary coil 68a of a transformer 70a. Primary coil 68a is arranged so that its positive terminal 72a and negative terminal 74a are electrically connected to electrode 36 and the output resistor 66 of filter 60 respectively.

Figure 2:
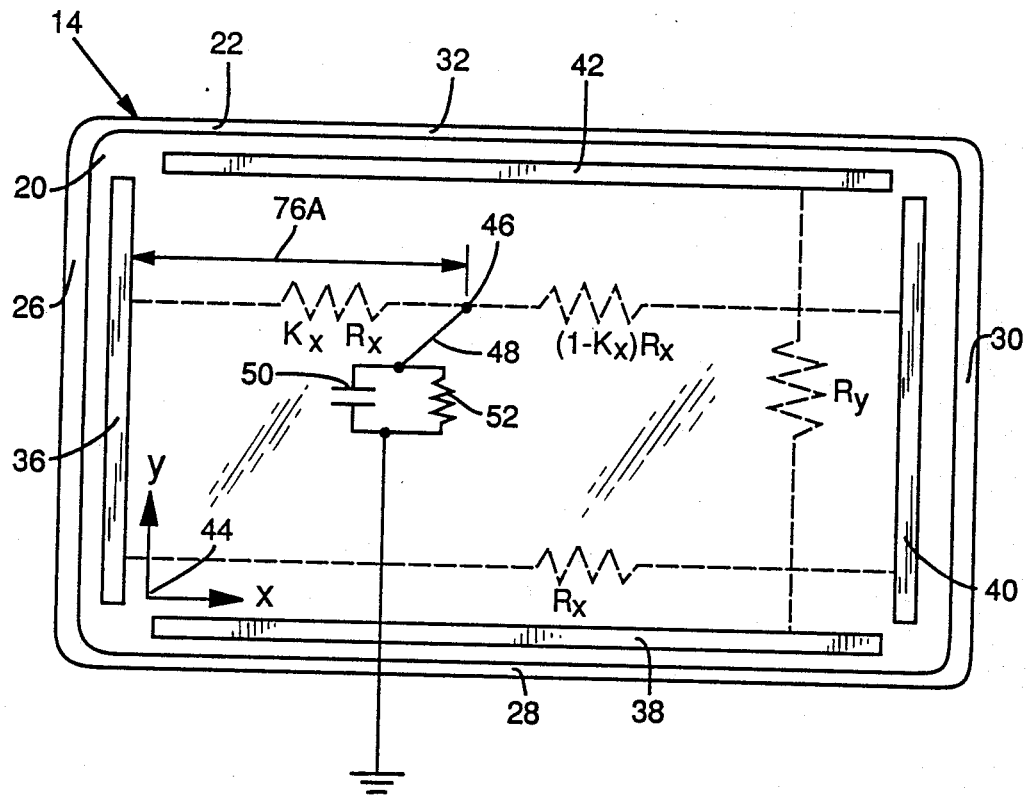
FIG. 2 is an enlarged frontal schematic diagram of the faceplate of the touch panel system of FIG. 1.

With reference to FIGS. 1 and 2, stylus 48 in contact with touch location 46 may be modeled as dividing the resistance $R_x$ into a first resistance $k_x R_x$ and a second resistance $(1-k_x)R_x$, the term $k_x$ representing the normalized distance 76a between touch location 46 and electrode 36. The first resistance represents the resistance of layer 20 between touch location 46 and electrode 36, and the second resistance represents the resistance of layer 20 between touch location 46 and electrode 40. Stylus 48 in contact with layer 20 draws currents proportional to the measurement signal to electrical ground. Position measurement subcircuits 54a and 54c measure the currents drawn to electrical ground via the respective first and second resistances, thereby to indicate the position of touch location 46 along the X-axis.

With reference to position measurement subcircuit 54a, transformer 70a includes two secondary coils 78a and 80a that are inductively coupled to primary coil 68a. Secondary coil 78a has a positive terminal 82a and a negative terminal 84a that are electrically connected to an inverting input 86a of a differential amplifier 88a and ground, respectively. Similarly, secondary coil 80a has a negative terminal 92a and a positive terminal 94a that are electrically connected to noninverting input 96a of differential amplifier 88a and ground, respectively. Differential amplifier 88a operates in the differential-input, differential-output mode.

The current drawn to ground via the first resistance flows through primary coil 68a. This current induces in secondary coils 78a and 80a a current $I_a$ that flows through positive terminal 82a, negative terminal 92a, and a resistor 98a of 22 ohms that is connected between them. The current $I_a$ generates across resistor 98a a potential different porportional to the current drawn through electrode 36 by the presence of stylus 48 at touch location 46. The potential difference is applied to inputs 86a and 96a of differential amplifier 88a, which generates at its positive output 106a and negative output 108a respective positive and negative differential output signals representing the current drawn through electrode 36. The differential output signals are modulated at the substantially random measurement signal frequency, and the magnitudes of the differential output signals are inversely proportional to the distance 76a between touch location 46 and electrode 36.

Outputs 106a and 108a deliver the positive and negative differential output signals to different inputs of a single pole-double throw demodulation switch 114a having a switching control input 116a that receives as a reference signal the substantially random measurement signal generated by measurement signal source 56. Switch 114a generates a demodulated output signal by delivering to output 118a the positive and negative differential output signals during the respective +V and −V voltage levels of the measurement signal. As a result, differential amplifier 88a and switch 114a cooperate to function as a "lock-in" amplifer that is "locked-in" to the measurement signal frequency and coherently demodulates the differential output signals. The demodulated output signal represents a relatively low-noise, substantially steady-state address signal that corresponds to an average of the magnitude of the current drawn through electrode 36; is indicative of the distance 76a between touch location 46 and electrode 36; and is substantially independent of the relative impedances of capacitor 50 and resistor 52 of stylus 48.

Demodulation switch 114a delivers on its oputput the steady-state address signal to a first low pass filter 124a having a 3dB cut-off frequency of 3.3 kHz. The cutoff frequency of low pass filter 124a is selected so that it rapdily delivers a filtered address signal of substantial magnitude to an automatic gain control circuit 126. Gain control circuit 126 includes diodes 128a, 128b, 128c, and 128d that receive at their anodes 130a, 130b, 130c, and 130d the measurement signals generated by the respective position measurement subcircuits 54a, 54b, 54c, and 54d. The cathodes 132a, 132b, 132c, and 132d of the respective diodes 128a, 128b, 128c, and 128d are electrically connected and deliver to a gain normalizing stage 134 the one of the address signals generated by subcircuits 54a–54d having the greatest voltage magnitude. Normalizing stage 134 automatically normalizes further processing of the addressing signals with reference to the one measurement signal.

Filter 124a also delivers the address signal to a second low pass filter 136a having a 3 dB frequency of 100 Hz for optimizing the signal-to-noise ratio of the address signal. Filters 124a and 136a cooperate to reject incoherent noise signals that are injected into touch panel system 10 by electromagnetic waves or a system user. Filter 136a delivers the address signal to an input 138a of a four input-to-one output analog multiplexer 140, which transmits in a serial fashion to an analog-to-digital converter 142 the address signals generated by subcircuits 54a–54d. Analog-to-digital converter 142 communicates with microprocessor 62 that receives the digital address signals and generates in response to them the X- and Y-coordinates of touch location 46.

The cathode-ray tube of display device 18 forms an image by scanning an electron beam (not shown) in a raster pattern across display screen 16. Such an image is formed of image frames that include between about 200 and 2,000 horizontal scan lines and that are addressed at frequencies of between 20 and 90 Hz. The beam current of the scanning electron beam changes in accordance with the magnitude of a video signal that carries information representing the image to be rendered. The video signal further includes for each horizontal scan line a flyback or retrace pulse that directs the electron beam to return to a starting scan position after the completion of each successive horizontal scan line. The flyback pulses relate in a one-to-one fashion to the horizontal scan lines and occur, therefore, at frequencies of about 15-200 kHz.

Conductive layer 20 of touch panel system 10 has a relatively large surface area (e.g. abou 1100 $cm^2$) that causes the layer to function as a capacitor. As a consequence, the flyback pulses on a video signal are capacitively induced onto layer 20, thereby introducing noise signals of substantial magnitudes into measurement system 12. For example, the noise signals associated with the flyback pulses can have voltage magnitudes up to about 100 times the magnitude of the measurement signal on conductive layer 20.

Position measurement apparatus 12 is capable of determining the position of touch location 46 by means of the cooperation between the random variations in the measurement signal frequency and the lock-in characteristics of position measurement subcircuits 54a–54d. In particular, the noise signals associated with the flyback pulses as well as other electromagnetic noise sources are incoherent with the substantially random measurement signals. Accordingly, low pass filters 124a–124d and 136a–136d cooperate with the lock-in characteristics of subcircuits 54a–54d to attenuate the noise signals, thereby to allow the detection of touch location 46.

Another aspect of the present invention is that the substantially random variations in the measurement signal frequency reduces the magnitude of the electromagnetic noise generated by position measurement apparatus 12 at any selected frequency. In particular, the measurement signal frequency ranges over a bandwidth of 150–250 kHz such that electromagnetic noise generated by the measurement signal is also distributed over the same bandwidth. As a result, the electromagnetic noise generated by position measurement apparatus 12 at any selected frequency is of relatively low magnitude, thereby reducing the electromagnetic interference generated by position measurement apparatus 12.

The following sets forth, by way of example only, a description of the manner in which microprocessor 62 identifies the position of touch location 46 along only the X-axis. The demodulated address signals generated by measurement subcircuits 54a and 54c are DC voltages, $V_1$ and $V_2$, that are proportional to the currents drawn through electrodes 36 and 40, respectively. With the position of touch location 46 along the X-axis represented by distance 76a (FIG. 2) and the variable X, microprocessor 62 represents the X-coordinate as:

$$X = V_1/(V_1 + V_2).$$

It will be appreciated that microprocessor 62 would employ a similar equation together with the demodulated address signals generated by subcircuits 54b and 54d to determine only the Y-coordinate of touch location 46.

To identify both the X- and Y-coordinates of touch location 46, microprocessor 62 communicates with a memory circuit 146 that stores a look-up table listing the X- and Y-axis coordinates corresponding to particular measurement signal magnitudes. The look-up table may be empirically generated for each touch panel system to accommodate any irregularities in the resistivity of the conductive layer.

Touch panel system 10 is of a sturdy or robust configuration that also provides low-power operation. The configuration of system 10 is robust because of the limited number of electrodes in contact with conductive layer 20 and the inherent sturdiness of transformers. The low-power operation of system 10 is obtained because substantially no power is dissipated from conductive layer 20 unless it is touched by a stylus.

Figure 3:
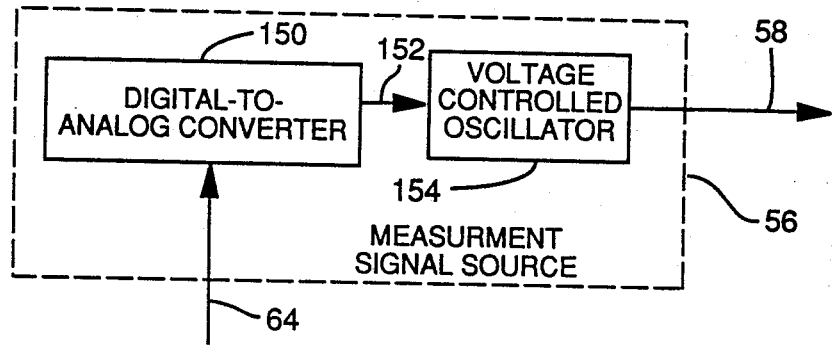
FIG. 3 is a circuit block diagram of a measurement signal source employed in the position measurement apparatus of FIG. 1.

With reference to FIG. 3, measurement signal source 56 includes a digitial-to-analog converter 150 coupled to input 64 to receive the pseudo-random number signal generated by microprocessor 62. In response to the pseudo-random number signal, digital-to-analog converter 150 generates a control voltage of a magnitude corresponding to the value of the pseudo-random number. The control voltage is delivered to a control input 152 of a voltage controlled oscillator 154, which is responsive to the control voltage to generate a measurement signal of a frequency corresponding to the magnitude of the control voltage. Accordingly, digital-to-analog converter 150 and voltage controlled oscillator 154 cooperate with microprocessor 62 to generate a measurement signal of a frequency that varies in a substantially random manner.

With reference to FIG. 1, the means by which output resistor 66 of filter 60 functions to improve the uniformity of the signal-to-noise ratios of the signals applied to measurement subcircuits 54a–54d is described with reference to an exemplary system that does not employ output resistor 66. Whenever a user touches the faceplate of the exemplary system at a location that is very close to an electrode that indicates position along a first axis, nearly all of the electrical current flowing from the faceplate and through the person is drawn from the electrode. Under these conditions, very little current is drawn from the electrodes that indicate position in the other axis. As a consequence, the magnitude of the signal-to-noise ratio of signals indicating position along the first axis can be up to 1,000 times greater than the magnitude of the signal-to-noise ratio of the signals indicating position along the orthogonal axis. Such a range of signal-to-noise ratios imposes extreme operating constraints on the dynamic range capabilities of the position measurement apparatus.

Output resistor 66 of filter 60 improves the uniformity of the signal-to-noise ratios of the signals applied to measurement subcircuits 54a–54d by providing each one of electrodes 36–42 with a nonzero resistance through which stylus 48 draws current. As a result, the currents drawn through electrodes 36–42 are of comparable magnitudes and typically differ by less than an order of magnitude. Resistor 66 functions, therefore, as an automatic gain control that substantially reduces the dynamic range requirements of subcircuits 54a–54d and allows a system user to "load" signal source 56.

It will be obvious to those having skill in the art that many changes may be made in the above-described details of the preferred embodiment of the present invention without departing from the underlying principles thereof. For example, a measurement signal of substantially random frequency could be generated in accordance with a pseudo-random number generated by a feedback shift register or an analog noise generator. The scope of the present invention should be determined, therefore, only by the following claims.

We claim:

1. In a display system including a display surface positioned adjacent an optically transparent, electrically conductive layer having a first resistivity and first and second opposed side margins of preselected lengths, a position address encoder for generating an address signal indicative of a location on the conductive layer in contact with a stylus that is electrically connected to a reference potential, comprising:
   signal generating means for generating a time-varying position measurement signal of a preselected magnitude and a frequency that varies in a substantially random manner;
   first and second electrodes positioned along the lengths of the respective first and second opposed side margins and receiving the position measurement signal generated by the signal generating means, the resistivity of the conductive layer establishing an effective total resistance between the first and second electrodes; and
   current measuring means for measuring currents corresponding to the position measurement signal and drawn through the first and second electrodes whenever a stylus contacts the conductive layer, whereby the stylus contacting the conductive layer divides the total resistance into first and second resistances that cause currents to be drawn through the respective first and second electrodes in proportion to the separation between the electrodes and the location.

2. The encoder of claim 1 further comprising a source output filter having a high output impedance and being electrically connected between the signal generating means and the electrodes.

3. The encoder of claim 2 in which the source output filter includes a low-pass filter.

4. The encoder of claim 1 in which the position measurement signal is a continuous square-wave signal.

5. The encoder of claim 1 in which the current measuring means measures in parallel the currents drawn through the first and second electrodes.

6. The encoder of claim 1 in which the current measuring means includes means for generating a first potential difference proportional to a current drawn through the first electrode, and a first differential amplifier having first and second inputs across which the first potential difference is applied, the first differential amplifier forming on a first output a signal representing the current drawn through the first electrode.

7. The encoder of claim 6 in which the current measuring means further includes means for generating a second potential difference proportional to a current drawn through the second electrode, and a second differential amplifier having third and fourth inputs across which the second potential difference is applied, the second differential amplifier forming on a second output a signal representing the current drawn through the second electrode.

8. The encoder of claim 1 in which the conductive layer is disposed on an otpically transparent faceplate positioned adjacent the display surface.

9. The encoder of claim 1 in which the conductive layer further comprises third and fourth opposed side margins of preselected lengths positioned in a transverse direction to the first and second side margins and in which the encoder further comprises:
   third and fourth electrodes positioned along the lengths of the respective third and fourth opposed side margins and receiving the position measurement signal generated by the signal generating means; and
   current measuring means for measuring currents corresponding to the position measurement signal and drawn through the third and fourth electrodes whenever the stylus contacts the conductive layer.

10. The encoder of claim 9 in which the location at which the stylus contacts the conductive layer is defined in connection with first and second orthogonal axes and in which the currents drawn through the first and second electrodes define the location along the first axis and the currents drawn through the third and fourth electrodes define the location along the second axis.

11. In a display system including a display surface positioned adjacent an optically transparent, electrically conductive layer having a first resistivity and first and second opposed side margins of preselected lengths along which are positioned respective first and second electrodes, the resistivity of the conductive layer establishing an effective total resistance between the first and second electrodes, a method for generating a address signal representing a location on the conductive layer in contact with a stylus that is electrically connected to a reference potential, comprising:
   applying to the first and second electrodes a time-varying position measurement signal of substantially random frequency; and
   measuring currents drawn through the first and second electrodes and corresponding to the measurement signal whenever a stylus contacts the conductive layer, whereby the stylus contacting the conductive layer divides the total resistance into first and second resistances that cause currents to be drawn through the respective first and second electrodes in proportion to the separation between the electrodes and the location.

12. In a display system including a display surface positioned adjacent and optically transparent, electrically conductive layer having a first resistivity and first and second opposed side margins of preselected lengths, a position address encoder for generating an address signal indicative of a location on the conductive layer in contact with a stylus that is electrically connectd to a reference potential, comprising:
   signal generating means for generating an amplitude modulated drive signal of a frequency that varies in a substantially random manner;
   first and second electrodes positioned on the respective first and second opposed side margins and receiving the input signal generated by the signal generating means, the stylus in contact with the location on the conductive layer transforming the input signal into a position measurement signal representing the location; and
   measurement signal demodulating means receiving the position measurement signal for demodulating it in accordance with the input signal, thereby to generate the address signal indicative of the location on the conductive layer in contact with the stylus.

13. The encoder of claim 12 further comprising current measuring means to measure currents corresponding to the position measurement signal and drawn through the first and second electrodes whenever a stylus contacts the conductive layer, whereby the stylus contacting the conductive layer divides the total resistance into first and second resistances that cause currents to be drawn through the first and second electrodes in proportion to the separation between the electrodes and the location.

14. The system of claim 12 further comprising a source output filter having a high output impedance and being electrically connected between the signal generating means and the electrodes.

15. The system of claim 14 in which the source output filter includes a low-pass filter.

16. The system of claim 12 in which the position measurement signal generated by the signal generating means is continuous square-wave signal.

17. The system of claim 12 in which the current measuring means measures in parallel the currents drawn through the first and second electrodes.

18. The system of claim 12 in which the current measuring means includes means for generating a first potential difference proportional to a current drawn through the first electrode, and a first differential amplifier having first and second inputs across which the first potential difference is applied, the first differential amplifier forming on a first output a signal representing the current drawn through the first electrode.

19. The system of claim 18 in which the current measuring means further includes means for generating a second potential difference proportional to a current drawn through the second electrode, and a second differential amplifier having third and fourth inputs across which the second potential difference is applied, the second differential amplifier forming on a second output a signal representing the current drawn through the second electrode.

20. The system of claim 12 in which the conductive layer is disposed on an optically transparent faceplate that is positioned adjacent the display surface.

21. The system of claim 12 in which the conductive layer further comprises third and fourth opposed side margins of preselected lengths positioned transverse to the first and second side margins and in which the system further comprises:
   third and fourth electrodes positioned along the lengths of the respective third and fourth opposed side margins and receiving the position measurement signal generated by the signal generating means; and
   current measuring means for measuring currents corresponding to the position measurement and drawn through the third and fourth electrodes whenever the stylus contacts the conductive layer.

22. The system of claim 21 in which the location at which the stylus contacts the conductive layer is defined in connection with first and second orthogonal axes and in which the current drawn through the first and second electrodes define the location along the first axis and the currents drawn through the third and fourth electrodes define the location along the second axis.

* * * * *